C. O. MELICK.
T-SQUARE AND PROTRACTOR.
APPLICATION FILED JAN. 31, 1911.
1,010,664.
Patented Dec. 5, 1911.
2 SHEETS—SHEET 1.
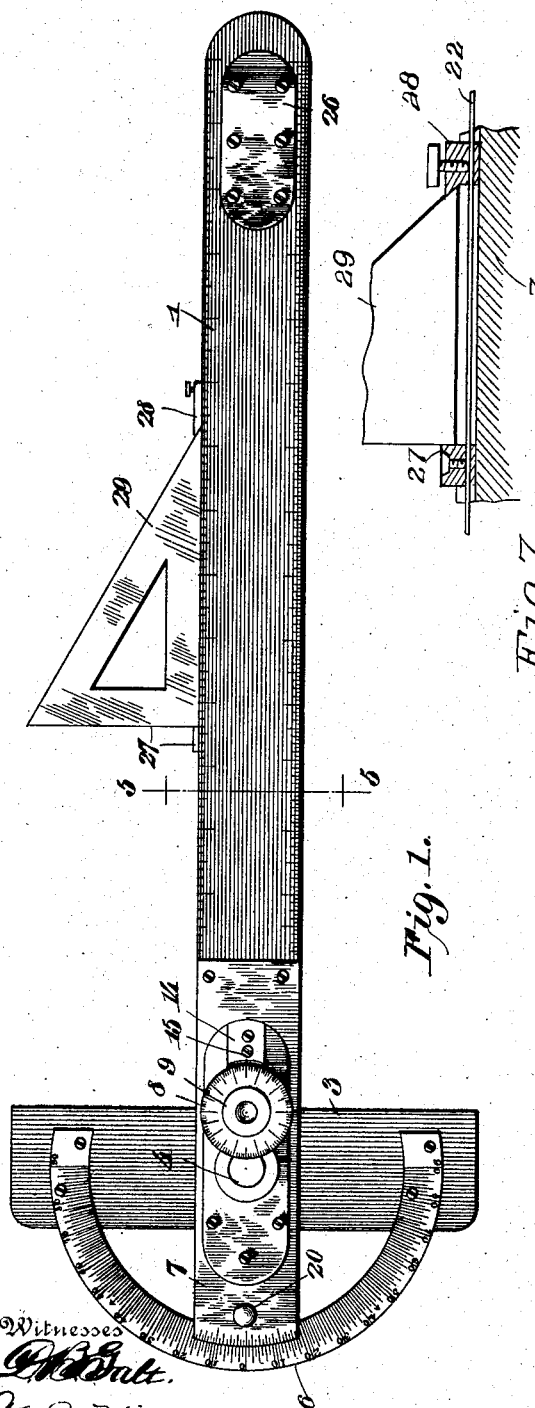
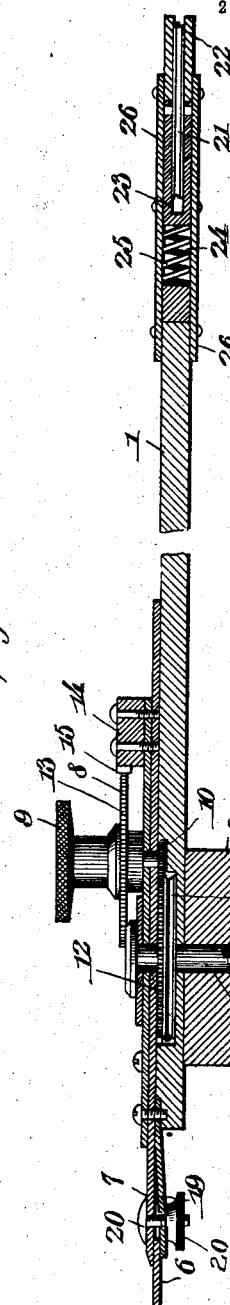
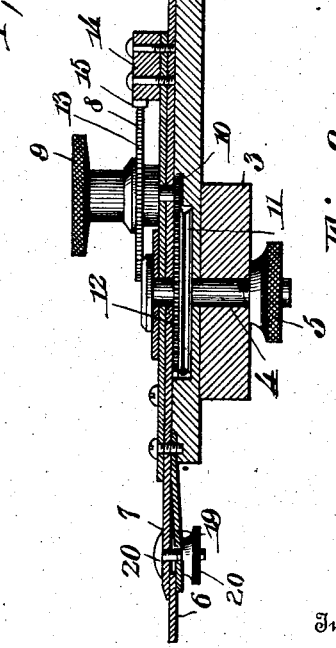
Inventor
Clark O. Melick.
By Victor J. Evans
Attorney
Witnesses

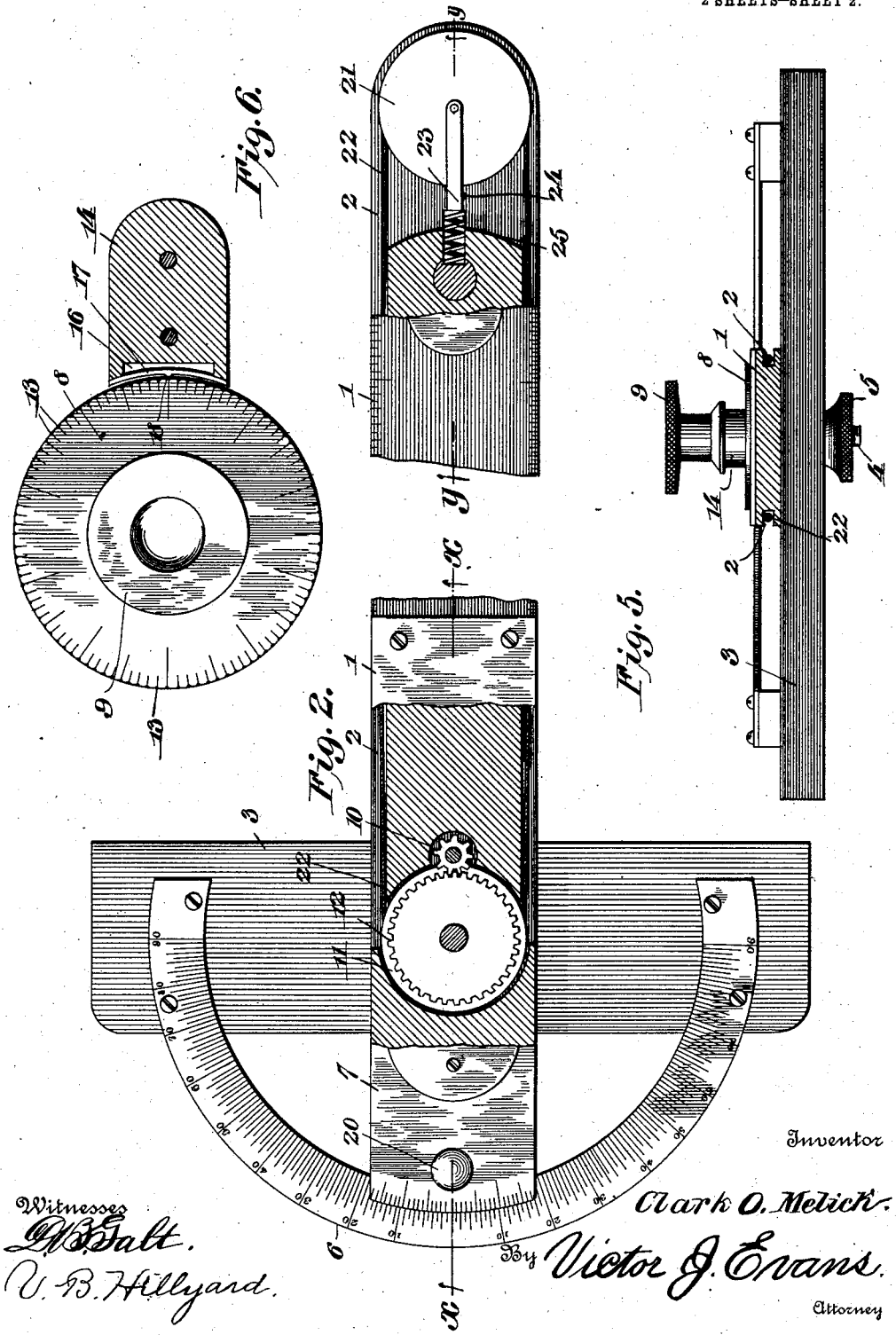

UNITED STATES PATENT OFFICE.

CLARK O. MELICK, OF CHICAGO, ILLINOIS.

T-SQUARE AND PROTRACTOR.

1,010,664.  Specification of Letters Patent.  Patented Dec. 5, 1911.

Application filed January 31, 1911. Serial No. 605,700.

*To all whom it may concern:*

Be it known that I, CLARK O. MELICK, a citizen of the United States, residing at Chicago, in the county of Cook and State of Illinois, have invented new and useful Improvements in T-Squares and Protractors, of which the following is a specification.

The invention supplies an instrument designed for use as a T or angle square, spacer, liner and shader, protractor and rule for laying off work or measuring plans which have been drawn to a scale.

In its specific adaptation the invention provides a drafting instrument which will admit of angles being accurately determined, variable spacing between shade or other lines requiring to be spaced apart with the spaces increasing or decreasing progressively and for a variety of work generally requiring separate instruments such as a protractor, spacer, angle square and the like.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a top plan view of a combined T-square and protractor embodying the invention, showing a triangle in operative position. Fig. 2 is a plan view of the instrument on a larger scale, parts being broken away. Fig. 3 is a longitudinal section on the line $x$—$x$ of Fig. 2. Fig. 4 is a longitudinal section on the line $y$—$y$ of Fig. 2. Fig. 5 is a section on the line 5—5 of Fig. 1, looking to the left, as indicated by the arrows. Fig. 6 is a top plan view of the graduated disk and a horizontal section of the plate supporting the click spring. Fig. 7 is a detail view, showing the manner of attaching the carrier and the stop to the endless wire.

Corresponding and like parts are referred to in the following description, and indicated in all the views of the drawings, by the same reference characters.

The instrument comprises a blade 1, which is provided in opposite edges with a groove 2. A T-head 3 is located at one end of the blade 1 and is pivotally connected thereto and secured in the adjusted position by means of a bolt 4 and thumb nut 5. A protractor 6 is secured to the T-head 3 and consists of a semicircular bar properly graduated to accurately determine the required angle. A plate 7 is secured to the blade 1 and projects from the inner end thereof a distance to overlap the protractor 6 and has a vernier at its outer end to determine with accuracy the fractional parts of degrees. The blade 1 is preferably of wood, whereas the plate 7 is metal and secured to the blade in any substantial way. A graduated disk is mounted upon the inner end of the blade 1 and is preferably carried by the plate 7 and is attached to a stem having a button or thumb piece 9 at its outer end and a pinion 10 at its inner end. The disk 8 is divided into one hundred divisions, which are indicated by tens. It is to be understood that the disk 8 may be graduated according to any desired scale to meet special requirements for particular work, but it is preferred in general to lay off the disk in graduations corresponding to one hundred divisions. The stem carrying the graduated disk is rotatably mounted in the plate 7 and is secured thereto by means of the pinion 10, which acts in the capacity of a washer. A grooved wheel 11 mounted upon the bolt 4 has a gear wheel 12, the teeth of which mesh with the teeth of the pinion 10, said grooved wheel being rotated by means of the button or thumb piece 9 forming a part of the stem carrying the graduated disk 8. The diameter of the grooved wheel 11 corresponds approximately to the distance between the grooves formed in opposite edges of the blade 1 so that opposite points of the grooved portion of the gear wheel 12 come about flush with the inner walls of the opposite grooves 2. The blade 1 is recessed in the side adjacent the plate 7 to receive the gear wheel 12 and pinion 10. The recess intersects at opposite points with the grooves 2 so as to expose edge portions of the gear wheel or admit of opposite edge portions projecting into the grooves 2. Notches 13 are formed in the edge of the graduated disk 8 and correspond with the scale graduations. A plate 14 is attached to the plate 7 and has a mark 15 to register with the graduations of the disk 8 and said plate has the end adjacent the graduated disk formed with a recess 16, which is spanned by means of a light spring 17 attached to the plate 14 and having a cog or point 18 to snap into the notches 13 and emit a clicking sound so that the operator may know when the mark 15 is in register with the required graduation of the disk 8. The spring 17, as also the inner end of the plate 14, curves to correspond with the curvature of the graduated disk so as to fit the same closely.

A plate 19 is secured to the under side of the projecting end of the plate 7 and underlaps the protractor 6 and is adapted to clamp said protractor to secure the blade 1 in the required adjusted position. A bolt and nut 20 connects the plates 7 and 20 and admits of tightening the same to clamp the protractor 6 after the blade 1 has been moved to the required adjusted position.

At the outer end of the blade 1 is located a grooved wheel 21 equal in diameter to the grooved wheel 12 and arranged in a mortise or kerf formed in the blade. The grooved wheel 21 is yieldable, being moved outward by spring pressure so as to take up any slack in a wire 22 which passes around the grooved wheels 11 and 21 and has its opposite portions lying within the grooves 2. The purpose of yieldingly mounting the grooved wheel 21 is to preserve a tension upon the endless wire 22 to cause the same to move positively with the grooved wheel 11 when rotating the same by means of the button 9. A frame 23 of substantially U-form is mounted in a slot 24 and receives the grooved wheel 21, which is mounted therein. A spring 25 exerts an outward pressure upon the frame 23 and is of helical form and expansible, said spring being located in the inner end of the slot 24. Plates 26 are secured to opposite sides of the blade 1 and close the sides of the slot 24 and retain the frame 23 and spring 25 in place.

A carrier 27 is secured to the wire 22 to move therewith and has a portion fitting within the groove 2. A rule of any nature may be attached to the carrier 27 to move therewith. A stop 28 is adapted to be adjustably connected to the wire 22 and is adapted to coöperate with the carrier 27 to retain the marking device 29 in place. The stop 28 has a portion fitted in the groove 2 and is constructed to engage the device 29 and retain the same in place. As illustrated the marking device 29 consists of a triangle which is clamped between the carrier 27 and the stop 28.

The relative angular position of the blade 1 to the T-head 3 may be determined by the protractor 6 and vernier at the outer end of the plate 7, the blade being secured in the desired position by means of the bolt 4 and thumb nut 5. When it is required to draw lines regularly spaced apart the button or thumb piece 9 is turned one or more graduations of the disk 8, the pen or marking instrument being moved along the edge of the triangle or marking device 29. If the lines are to be variably spaced the same may be determined with accuracy by turning the graduated disk 8 the required number of divisions. Rotation of the graduated disk 8 causes a corresponding movement of the grooved wheel 11 and the endless wire 23. The groove in the edge of the wheel 11 is of V-form so as to engage the wire 23 and cause positive movement thereof. The relative diameters of the pinion 10 and gear wheel 12 are such that a complete revolution of the grooved wheel 11 will cause a movement of the wire 22 one inch, hence movement of the graduated disk 8 one division moves the wire or carrier 27 one-hundredth of an inch and a movement of the graduated disk 8 ten spaces or divisions thereof effects a movement of the wire 22 and carrier 27 one-tenth of an inch.

From the foregoing description, taken in connection with the accompanying drawings, the advantages of the construction and of the method of operation will be readily apparent to those skilled in the art to which the invention appertains, and while I have described the principles of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In an instrument of the character set forth, the combination of a blade, an endless wire or strand mounted in the blade, means for attaching a marking device or ruler to the endless wire, and a graduated mechanism for moving the endless wire a determinate distance.

2. In a device of the nature set forth, the combination of a blade, an endless wire or strand mounted therein, means for attaching a line directing device to said wire, a wheel having the endless wire passing therearound, and a graduated operating mechanism for said wheel to move the same and the wire a predetermined distance.

3. In a device of the character described, the combination of a blade, an endless wire or strand mounted therein, a wheel mounted in the blade and having a portion of the endless wire passing therearound, a graduated disk, and gearing between the graduated disk and the said wheel for moving the endless wire a predetermined distance.

4. In a device of the nature set forth, the combination of a blade, an endless wire mounted therein, a graduated disk, a wheel having part of said endless wire passing therearound, gearing between the graduated disk and wheel, and a click coöperating with the graduated disk to indicate audibly the degree of movement thereof.

5. In a device of the character set forth, the combination of a blade having grooves in its opposite edges, grooved wheels mounted in opposite end portions of the blade, an endless wire or strand passing around the grooved wheels and arranged within the grooves of the blade, a carrier mounted upon the blade and attached to the endless wire, and a graduated operating mechanism mounted upon the blade for moving the endless wire a predetermined distance.

6. In a device of the character substantially as set forth, the combination of a blade, an endless wire or strand, supporting means for the endless wire, one of said supporting means consisting of a wheel, means for yieldingly sustaining one of the endless wire supporting means to automatically take up slack and maintain the endless wire under tension, and a graduated operating mechanism for rotating the supporting wheel to move the endless wire a predetermined distance.

7. In combination a blade, an endless wire, means at opposite ends of the blade for supporting the endless wire, a spring normally exerting a pressure upon one of said supporting means to preserve the endless wire under tension at all times, a carrier attached to the endless wire and adapted to receive a line directing marking device, and a graduated operating mechanism for moving the endless wire a predetermined distance.

8. In combination a blade, an endless wire mounted in the blade, supporting wheels for the wire at opposite ends of the blade, a frame mounted in the blade and having one of the wire supporting wheels carried thereby, a spring normally exerting a pressure upon the frame to maintain the endless wire under tension, and graduated operating means for moving the endless wire a predetermined distance.

9. In combination a blade having an opening and an intersecting slot, a wheel mounted in the opening, a frame carrying said wheel mounted in the slot, a spring arranged in said slot and normally exerting a pressure upon the frame, an endless wire passing around said wheel, a second wheel located at the opposite end of the blade and receiving the endless wire, a carrier attached to the endless wire and adapted to have a line directing device attached thereto, and graduated operating means for moving the endless wire a predetermined distance.

10. In combination a blade having an opening and an intersecting slot, a U-shaped frame arranged in the slot, a wheel mounted in the frame and arranged in the said opening, a spring located in a slot and normally exerting a pressure upon the frame, plates secured to opposite sides of the blade, closing the sides of the slot and retaining the said frame and spring therein, an endless wire supported upon the wheel, a second wheel arranged at the opposite end of the blade and supporting the endless wire, a carrier attached to the endless wire and adapted to have a line directing device attached thereto, and graduated operating means for rotating said second wheel through a given angle to move the endless wire a predetermined distance.

11. In combination a blade having opposite edges grooved, grooved wheels mounted in opposite ends of the blade, yieldable supporting means for the wheel at the outer end of the blade, an endless wire passing around the grooved wheels and located in the grooved edges of the blade, a graduated disk mounted upon the inner end of the blade and gearing between the graduated disk and the grooved wheel at the inner end of the blade for moving the endless wire a predetermined distance.

12. In combination a blade having a grooved edge, wheels mounted in opposite end portions of the blade, an endless wire or strand passing around said wheels and having a portion fitted in the grooved edge of the blade, graduated operating means for rotating one of said wheels for moving the endless wire a predetermined distance, a carrier attached to the endless wire and having a portion extending into the grooved edge thereof, and a stop adjustable upon said wire and adapted to coöperate with the carrier to secure a marking device to the endless wire.

In testimony whereof I affix my signature in presence of two witnesses.

CLARK O. MELICK.

Witnesses:
SIMON F. FOGG,
CLARENCE J. BREMER.

---

Copies of this patent may be obtained for five cents each, by addressing the "Commissioner of Patents, Washington, D. C."